(12) United States Patent
Paielli

(10) Patent No.: US 10,746,248 B2
(45) Date of Patent: Aug. 18, 2020

(54) VALVE ASSEMBLY

(71) Applicant: Tenneco Automotive Operating Company Inc., Lake Forest, IL (US)

(72) Inventor: Perry Paielli, Commerce Township, MI (US)

(73) Assignee: Tenneco Automotive Operating Company Inc., Lake Forrest, IL (US)

( * ) Notice: Subject to any disclaimer, the term of this patent is extended or adjusted under 35 U.S.C. 154(b) by 105 days.

(21) Appl. No.: 16/044,922

(22) Filed: Jul. 25, 2018

(65) Prior Publication Data

US 2018/0328444 A1    Nov. 15, 2018

(51) Int. Cl.
| | |
|---|---|
| *F16F 9/34* | (2006.01) |
| *F16F 9/512* | (2006.01) |
| *F16F 9/32* | (2006.01) |
| *B60G 13/08* | (2006.01) |
| *B60G 17/06* | (2006.01) |

(52) U.S. Cl.
CPC .............. *F16F 9/341* (2013.01); *B60G 13/08* (2013.01); *F16F 9/325* (2013.01); *F16F 9/3271* (2013.01); *F16F 9/34* (2013.01); *F16F 9/5126* (2013.01); *B60G 17/06* (2013.01); *B60G 2202/24* (2013.01); *B60G 2500/11* (2013.01); *F16F 2230/32* (2013.01)

(58) Field of Classification Search
CPC .. F16F 9/34; F16F 9/348; F16F 9/3484; F16F 9/3488; Y10T 137/1797; Y10T 137/1812; Y10T 137/1819; Y10T 137/1827; Y10T 29/49412; Y10T 29/49421; Y10T 29/49425; B23P 15/001
See application file for complete search history.

(56) References Cited

U.S. PATENT DOCUMENTS

| | | | | | |
|---|---|---|---|---|---|
| 2,310,570 | A | * | 2/1943 | Briggs | F16F 9/52 188/276 |
| 2,773,961 | A | * | 12/1956 | Sundt | H01H 85/0458 337/166 |
| 4,487,662 | A | * | 12/1984 | Fischbeck | F16K 99/0001 205/122 |
| 4,723,896 | A | * | 2/1988 | Fritchman | F04B 39/10 417/571 |
| 6,102,897 | A | * | 8/2000 | Lang | A61M 5/16827 137/67 |
| 6,460,664 | B1 | | 10/2002 | Steed et al. | |
| 6,464,053 | B1 | | 10/2002 | Hoebrechts | |
| 6,899,207 | B2 | | 5/2005 | Deferme et al. | |
| 7,703,586 | B2 | | 4/2010 | Deferme | |

(Continued)

FOREIGN PATENT DOCUMENTS

WO    WO-2019088983 A1 *    5/2019    ........ B01L 3/502738

*Primary Examiner* — Bradley T King
(74) *Attorney, Agent, or Firm* — McGarry Bair PC

(57) ABSTRACT

A valve assembly includes a first valve plate defining at least one first opening and at least one second opening. A valve element located above the first valve plate has a central portion, and at least one tab extending outwards from the central portion. The at least one tab includes a narrow portion axially aligned with the at least one first opening such that the narrow portion at least partially covers the at least one first opening. The at least one tab is selectively provided with electrical energy to melt the narrow portion to form an orifice. The orifice is fluidly coupled with the at least one first opening.

18 Claims, 9 Drawing Sheets

(56) References Cited

U.S. PATENT DOCUMENTS

| | | |
|---|---|---|
| 8,069,964 B2 | 12/2011 | Deferme |
| 8,997,953 B2 | 4/2015 | Deferme |
| 9,500,251 B2 | 11/2016 | Rummel et al. |
| 9,587,703 B2 | 3/2017 | Rummel |
| 9,845,839 B2 | 12/2017 | Rummel |
| 2005/0158188 A1* | 7/2005 | Matsui .................. F04B 43/043 417/410.1 |
| 2007/0034466 A1 | 2/2007 | Paesmans et al. |
| 2008/0173354 A1* | 7/2008 | Debray ............... F16K 99/0001 137/74 |
| 2008/0314465 A1* | 12/2008 | Park .................... F16K 99/0001 137/827 |
| 2009/0001303 A1* | 1/2009 | Bejhed .................... F16K 13/04 251/118 |
| 2010/0276005 A1* | 11/2010 | Allain ............... B01L 3/502738 137/1 |
| 2011/0204266 A1* | 8/2011 | Gronland ............ F16K 99/0001 251/12 |
| 2013/0133757 A1* | 5/2013 | Akinwande ........... F16K 99/003 137/74 |
| 2016/0298711 A1* | 10/2016 | Colombo .............. E05F 1/1091 |

\* cited by examiner

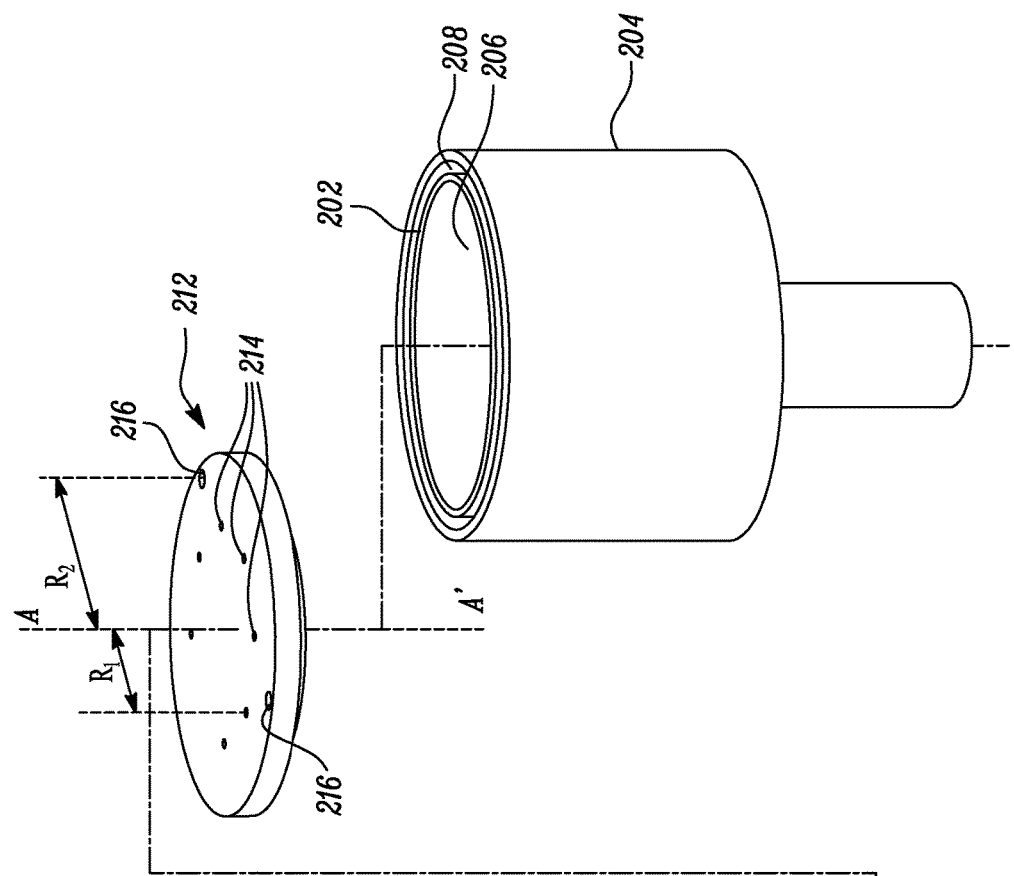
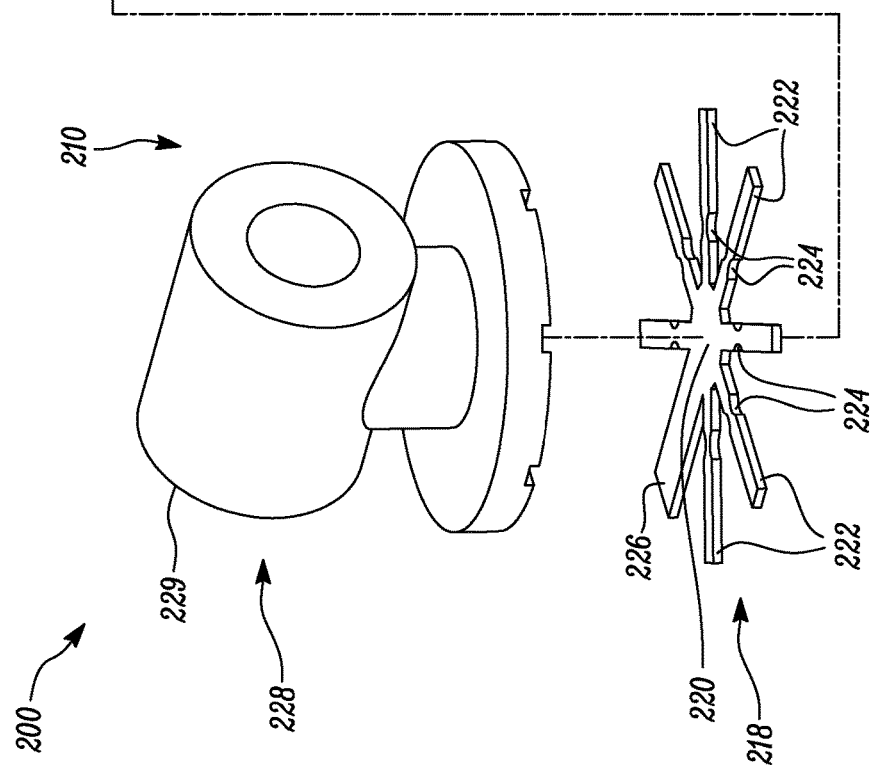
FIG. 2

VALVE ASSEMBLY

TECHNICAL FIELD

The present disclosure relates to a valve assembly. More specifically, the present disclosure relates to a valve assembly for a damper.

BACKGROUND

The basic function of damping is commonly realized by the flow of fluid through a restricted path. A damper often uses a piston enclosed in a cylinder to push fluid through an orifice, or a set of orifices. The restricted fluid flow creates a force that opposes the movement of the piston. The magnitude of the opposing force is a function of the orifice(s) size and the rate of the piston movement. The orifice size and/or quantity of orifices may establish the range of damping forces.

The manufacture of dampers requires maintaining a stock of different fluid metering valve assemblies. The manufacturing tolerances of the components need to be maintained within ranges that are specific to each valve assembly. The valve assemblies/valve blocks are assembled into dampers to establish its damping performance. Each different metering valve block produces a damper with a specific damping characteristic. Manufacturing and maintaining an inventory of a variety of valves and their selective assembly into dampers may add cost to the manufacture of dampers.

SUMMARY

In an aspect of the present disclosure, a valve assembly includes a first valve plate defining at least one first opening and at least one second opening. The valve assembly includes a valve element located above the first valve plate. The valve element includes a central portion, and at least one tab extending outwards from the central portion. The at least one tab includes a narrow portion axially aligned with the at least one first opening such that the narrow portion at least partially covers the at least one first opening. The at least one tab is selectively provided with electrical energy to melt the narrow portion to form an orifice. The orifice is fluidly coupled with the at least one first opening.

In another aspect of the present disclosure, a valve assembly for a damper is provided. The damper includes an inner tube and an outer tube. The valve assembly includes a first valve plate attached to the outer tube of the damper. The first valve plate defines at least one first opening and at least one second opening. The at least one first opening is in fluid communication with an inner chamber defined by the inner tube of the damper. The at least one second opening is in fluid communication with an outer chamber defined between the inner tube and the outer tube of the damper. The valve assembly includes a valve element located above the first valve plate. The valve element includes a central portion, and at least one tab extending outwards from the central portion. The at least one tab includes a narrow portion axially aligned with the at least one first opening such that the narrow portion at least partially covers the at least one first opening. The at least one tab is selectively provided with electrical energy to melt the narrow portion to form an orifice. The orifice is fluidly coupled with the at least one first opening. The valve assembly further includes a second valve plate located above the valve element. The second valve plate fluidly communicates the orifice with the at least one second opening of the first valve plate.

In yet another aspect of the present disclosure, a valve assembly includes a first valve plate defining a first opening and at least one second opening. The valve assembly includes a valve element located above the first valve plate. The valve element includes a central portion located above the first opening, and at least one tab extending outwards from the central portion. The at least one tab includes a biasing portion which biases the central portion towards the first opening of the valve element. The at least one tab is selectively provided with electrical energy to change a spring characteristic of the at least one tab. The valve assembly further includes a second valve plate located above the valve element. The valve element is at least partially enclosed between the first valve plate and the second valve plate. The valve element moves between an engaged position in which the central portion of the valve element covers the first opening, and a disengaged position in which the first opening is fluidly coupled with the at least one second opening.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

FIG. 2 shows an exploded perspective view of the shock absorber having a valve assembly, in accordance with the present invention;

DETAILED DESCRIPTION

Figure 1:
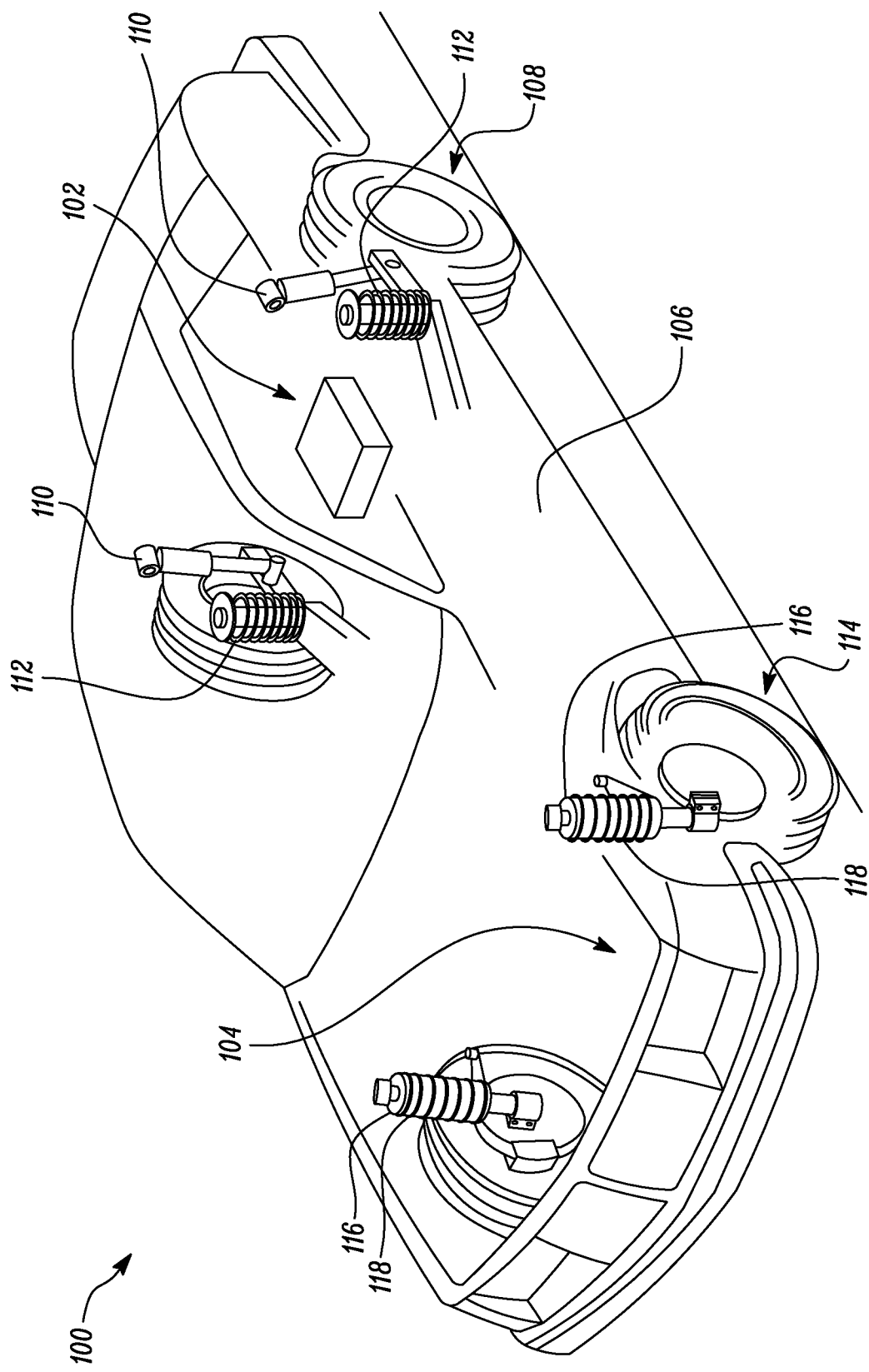
FIG. 1 illustrates an automobile using shock for improving ride performance, in accordance with the present invention.

The following description of the preferred embodiment(s) is merely exemplary in nature and is in no way intended to limit the invention, its application, or uses. Referring now to the drawings in which like reference numerals designate like or corresponding parts throughout the several views, there is shown in FIG. 1, a vehicle 100. The vehicle 100 includes a rear suspension 102, a front suspension 104 and a body 106. The rear suspension 102 includes a rear axle assembly (not shown) adapted to operatively support a pair of rear wheels 108. The rear axle assembly is operatively connected to the body 106 by means of a pair of rear dampers 110 and a pair of rear helical coil springs 112. Similarly, the front suspension 104 includes a front axle assembly (not shown) adapted to operatively support a pair of front wheels 114. The front axle assembly is operatively connected to the body 106 by a pair of front dampers 116 and by a pair of front helical coil springs 118.

The rear dampers 110 and the front dampers 116 serve to dampen relative motion of unsprung portion (i.e., front and rear suspensions 102, 104 respectively) from sprung portion (i.e., the body 106) of the vehicle 100. It should be contemplated that the rear dampers 110 and the front dampers 116 are substantially identical in structural and functional features. However, there may be slight variations based on deployment of the damper at a particular location (front or rear) on the vehicle 100. While the vehicle 100 has been depicted as a passenger car having front and rear axle assemblies, dampers may be used with other types of vehicles or in other types of applications including, but not limited to, vehicles incorporating independent or non-independent front and rear suspension assemblies. For the purpose of explanation of the present disclosure, the rear dampers 110 and the front dampers 116 will be referred to as dampers in the forthcoming description.

FIG. 2 shows an exploded view of a damper 200. The damper 200 includes an inner tube 202 and an outer tube 204. The inner tube 202 defines an inner chamber 206 such that a piston (not shown) may slide inside the inner tube 202. A working fluid (not shown) may be selectively compressed through sliding motion of the piston within the inner chamber 206 resulting in a dampening effect. An outer chamber 208 is defined between the inner tube 202 and the outer tube 204. The outer chamber 208 may also store the working fluid as a reservoir, and may selectively supply or receive the working fluid from the inner chamber 206. A valve assembly 210 fluidly couples the inner chamber 206 and the outer chamber 208.

The valve assembly 210 includes a first valve plate 212. The first valve plate 212 may be substantially disc-shaped. The first valve plate 212 is attached to the outer tube 204 of the damper 200. The outer tube 204 of the damper 200 may be crimped or rolled on the first valve plate 212 in order to provide sealing and physical strength. The outer tube 204 may be coupled to the first valve plate 212 by any other suitable method as well. The inner tube 202 may also be attached to the first valve plate 212 in a similar manner. The first valve plate 212 may include a peripheral portion which is attached to the outer tube 204 and covers the outer chamber 208. Further, the first valve plate 212 may at least partially extend inside the inner chamber 206 as well. The structure of the first valve plate 212 may be defined in any other suitable manner as well, and the present disclosure is not limited by any such changes in the structure of the first valve plate 212.

As illustrated, a central axis A-A' passes through a center of the first valve plate 212. The first valve plate 212 defines at least one first opening 214 and at least one second opening 216. The at least one first opening 214 is located at a first radial distance $R_1$ from the central axis A-A'. The at least one first opening 214 may include any number of first openings 214 defined in the first valve plate 212. In the illustrated embodiment, the at least one first opening 214 includes six concentric first openings 214 defined in the first valve plate 212 at the first radial distance $R_1$. The first openings 214 are fluidly coupled with the inner chamber 206. The first openings 214 may allow passage of working fluid out of the inner chamber 206. A size of each of the first openings 214 may vary based on an overall size of the damper 200, damping characteristics required, and an application area for which the damper 200 is being used.

The at least one second opening 216 is located at a second radial distance $R_2$ from the central axis A-A'. The second radial distance $R_2$ is greater than the first radial distance $R_1$. Thus, the at least one second opening 216 is defined closer to the peripheral portion of the first valve plate 212 as compared to the first openings 214. The at least one second opening 216 may include any number of second openings 216 defined in the first valve plate 212. In the illustrated embodiment, the at least one second opening 216 includes two concentric second openings 216 defined in the first valve plate 212 at the second radial distance $R_2$. The second openings 216 are fluidly coupled with the outer chamber 208. The second openings 216 may allow passage of working fluid into the outer chamber 208.

The valve assembly 210 includes a valve element 218 located above the first valve plate 212. The valve element 218 has a central portion 220 and at least one tab 222 extending outwards from the central portion 220. The central portion 220 may be substantially circular. The at least one tab 222 may include any number of tabs 222 in accordance with the number of first openings 214 included in the first valve plate 212. In the illustrated embodiment, the valve element 218 includes six tabs 222 corresponding to the six first openings 214. Each tab 222 extends outwards from the central portion 220. Each tab 222 includes a narrow portion 224 defined on the tab 222, such that the narrow portion 224 is axially aligned with the corresponding first opening 214. The narrow portion 224 at least partially covers the corresponding first opening 214.

The valve element 218 further includes a common tab 226 extending from the central portion 220. The common tab 226 has a uniform width along a length of the common tab 226. In an embodiment, the valve assembly 210 further includes a second valve plate 228 located above the valve element 218. However, the valve assembly 210 may also be envisioned without the second valve plate 228.

Figure 3:
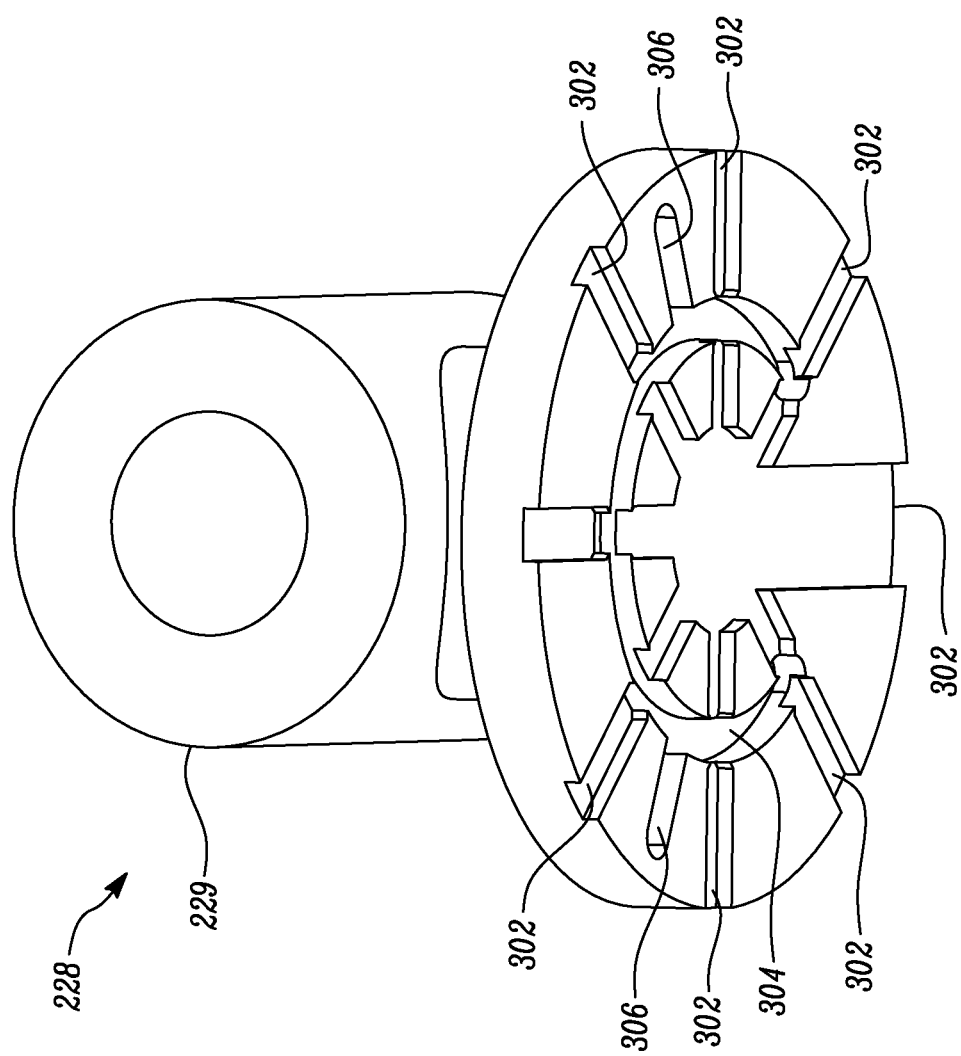
FIG. 3 shows a bottom perspective view of the second valve plate, in accordance with the present invention.

The second valve plate 228 may be coupled to the first valve plate 212 by any suitable joining means, such as ultrasonic welding, hot stamping, mechanical fasteners etc. FIG. 3 shows a bottom view illustrating structural details of the second valve plate 228. The second valve plate 228 may include a substantially disc-shaped main body. The second valve plate 228 further includes a bearing portion 229 that extends from the main body. The bearing portion 229 is adapted to be coupled to a bearing (not shown). The second valve plate 228 defines at least one first groove 302 which at least partially encloses the at least one tab 222. In the illustrated embodiment, as the valve element 218 includes six tabs 222 and the common tab 226, the second valve plate 228 defines corresponding first grooves 302 enclosing the corresponding tabs 222 and the common tab 226. Each groove 302 is open at a circumferential edge of the second valve plate 228 such that the tabs 222 and common tab 226 may extend through the circumferential edge.

The second valve plate 228 defines a continuous annular second groove 304 located at the first radial distance $R_1$ from the central axis A-A'. The second groove 304 is aligned with the narrow portion 224 of the tab 222. The second groove 304 is in axial alignment with the first openings 214 defined in the first valve plate 212. As the narrow portion 224 of the tabs 222 at least partially covers the corresponding first openings 214, the second groove 304 is fluidly coupled with the first openings 214. The second valve plate 228 further defines at least one channel 306 axially aligned with at least one of the first opening 214. The at least one channel 306 fluidly couples the second groove 304 with the at least one second opening 216. In the illustrated embodiment, there are two channels 306 corresponding to each one of the two second openings 216.

Figure 4:
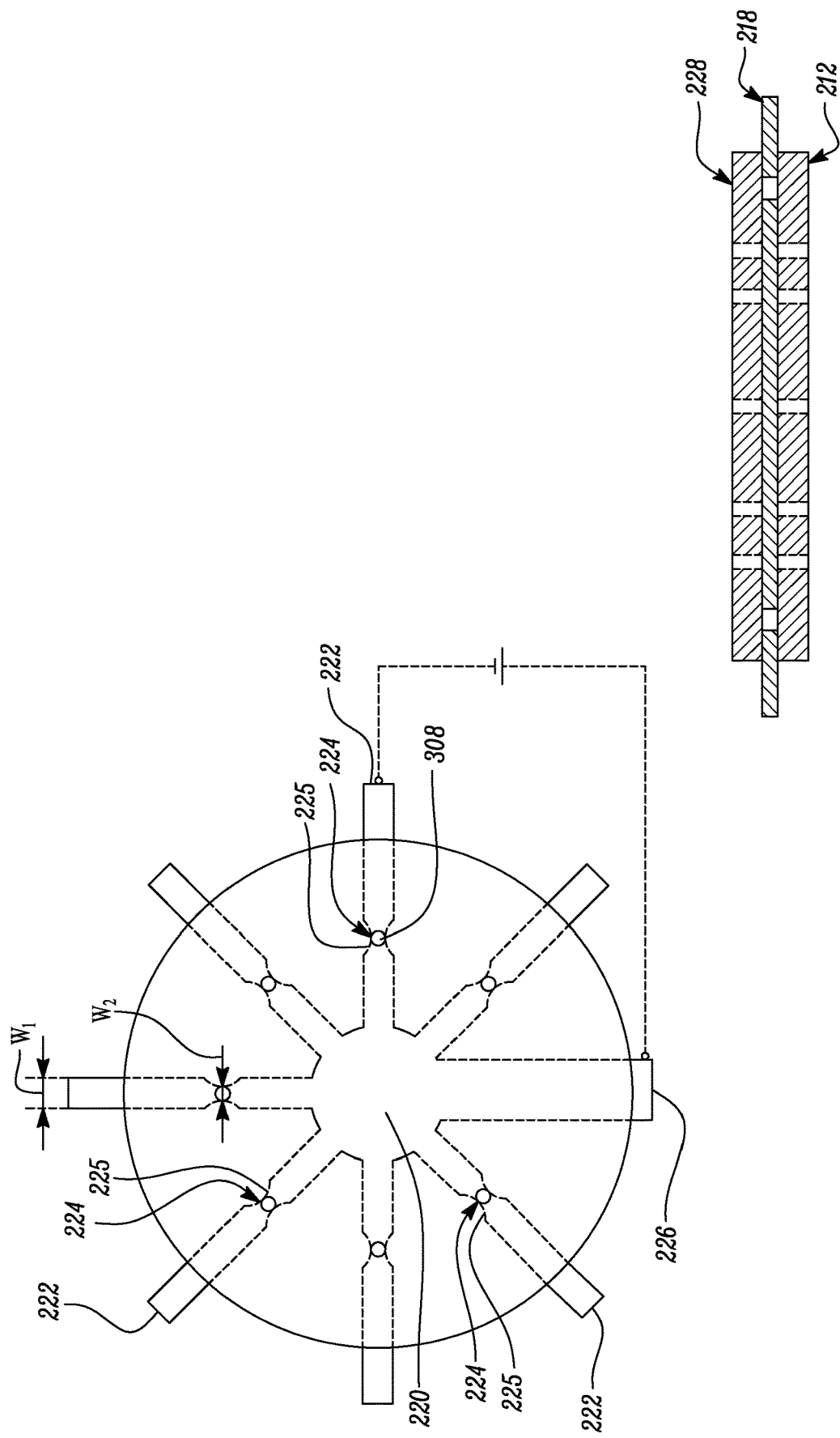
FIGS. 4A and 4B show different schematic views of the valve assembly, in accordance with the present invention.

FIGS. 4A and 4B are schematic views of the valve assembly 210. As shown in FIG. 4A, a minimum width $W_1$ of the narrow portion 224 is lesser than a width $W_2$ of the rest of the tab 222. Further, the narrow portion 224 include a pair of curved edges 225. With combined references to FIGS. 4A and 4B, during assembly of the damper 200, the first valve plate 212 is placed over the inner tube 202 and the outer tube 204. The valve element 218 is placed above the first valve plate 212 such that the narrow portions 224 of the tabs 222 align with the first openings 214. Then, the second valve plate 228 is placed over the valve element 218 such that the tabs 222 are at least partially enclosed by corresponding first grooves 302. The tabs 222 extend beyond a circumferential edge of one of the first valve plate 212 and the second valve plate 228. Electrical energy is passed through the common tab 226, and at least one tab 222. Passage of electrical energy through the at least one tab 222 raises temperature of the narrow portion 224. Material removal occurs at the narrow portion 224 through melting, or vaporization of the material of the tab 222. Material removal forms an orifice 308 at the narrow portion 224.

The first valve plate 212 and the second valve plate 228 may be made of a material which may be a poor electrical conductor, or an insulator. In some embodiments, each of the first valve plate 212 and the second valve plate 228 may be provided with a coating or a film of insulating material which insulates the first valve plate 212 and the second valve plate 228 from the electrical energy being passed through the valve element 218. In yet another embodiment, the valve element 218 may be provided with a coating or a film of insulating material which prevents flow of electricity to the first and second valve plates 212, 228.

Figure 5:
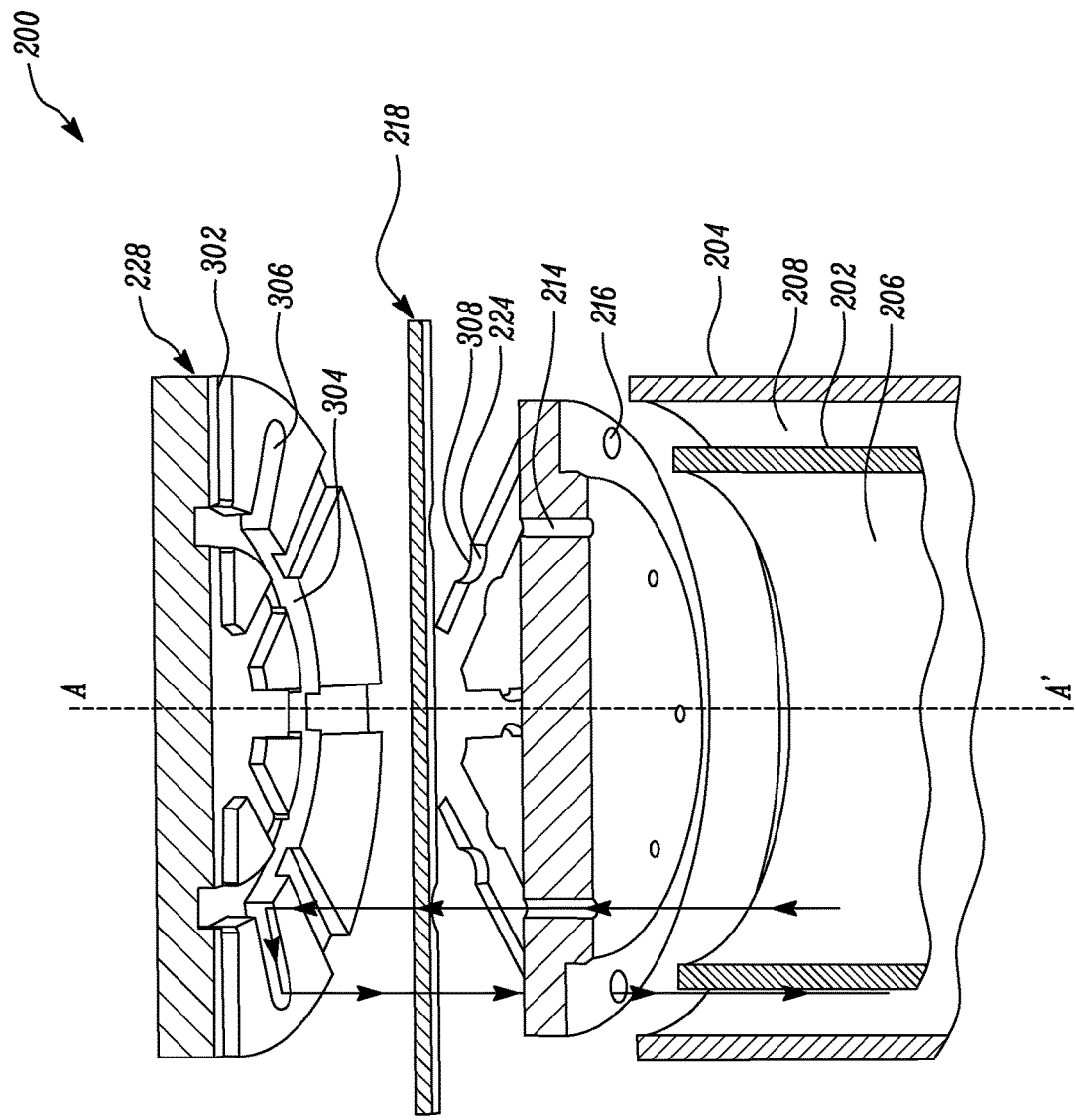
FIG. 5 shows a cross-sectional view of the shock absorber showing a flow pattern of a working fluid, in accordance with the present invention.

The orifice 308 is fluidly coupled with the first opening 214 of the first valve plate 212, and the second groove 304 of the second valve plate 228. FIG. 5 shows a cross-sectional view of the damper 200. As shown in FIG. 5, flow pattern of the working fluid from the inner chamber 206 to the outer chamber 208 is shown by dashed lines. The working fluid flows through at least one first opening 214 in the first valve plate 212. Then, the working fluid passes through the orifice 308 in the valve element 218. Subsequently, the working fluid flows through the second groove 304 in the second valve plate 228, the channel 306 in the second valve plate 228, and the at least one second opening 216 in the first valve plate 212 to flow into the outer chamber 208.

Electrical energy may be passed through any number of tabs 222 in combination with the common tab 226 to create orifices 308 in the tabs 222 as per application requirements. A number of orifices 308 to be formed in the tabs 222 may be decided based on factors, such as dampening requirements, pressure inside inner chamber 206, size of the damper 200, and application area for which the damper 200 is being used. Accordingly, appropriate number of orifices 308 are formed while assembling various components of the damper 200 together to achieve a desired dampening characteristic. Passage of electrical energy to selectively create orifices 308 in tabs 222 provides a manufacturer with an increased flexibility of design of the damper 200. A single manufacturing set up may be used to manufacture dampers 200 of varying dampening characteristic as per application requirements as only change is to be made in electrical connections between tabs 222. Further, multiple such dampers 200 produced in an assembly line may have slightly varying damping characteristics due to manufacturing variations. A number of orifices 308 may be created in one or more dampers 200 in order to maintain the damping characteristic of each damper 200 within a certain range of the desired damping characteristic.

Thus, the valve assembly 210 described by the present disclosure provides a user with a certain degree of programmability to suit the need of the application area for which the damper 200 is being used. The structural aspects of the valve element 218, the first valve plate 212 and the second valve plate 228 described in the context of the present disclosure are merely exemplary. It should be contemplated that there may be various other structural arrangements to provide different means of fluid flow patterns from the inner chamber 206 to the outer chamber 208, and the present disclosure is not limited by any such structural configurations. The structure of the valve element 218, and steps of passage of electrical energy ensure that the valve assembly 210 may be suitably modified as per application requirements.

Figure 6:
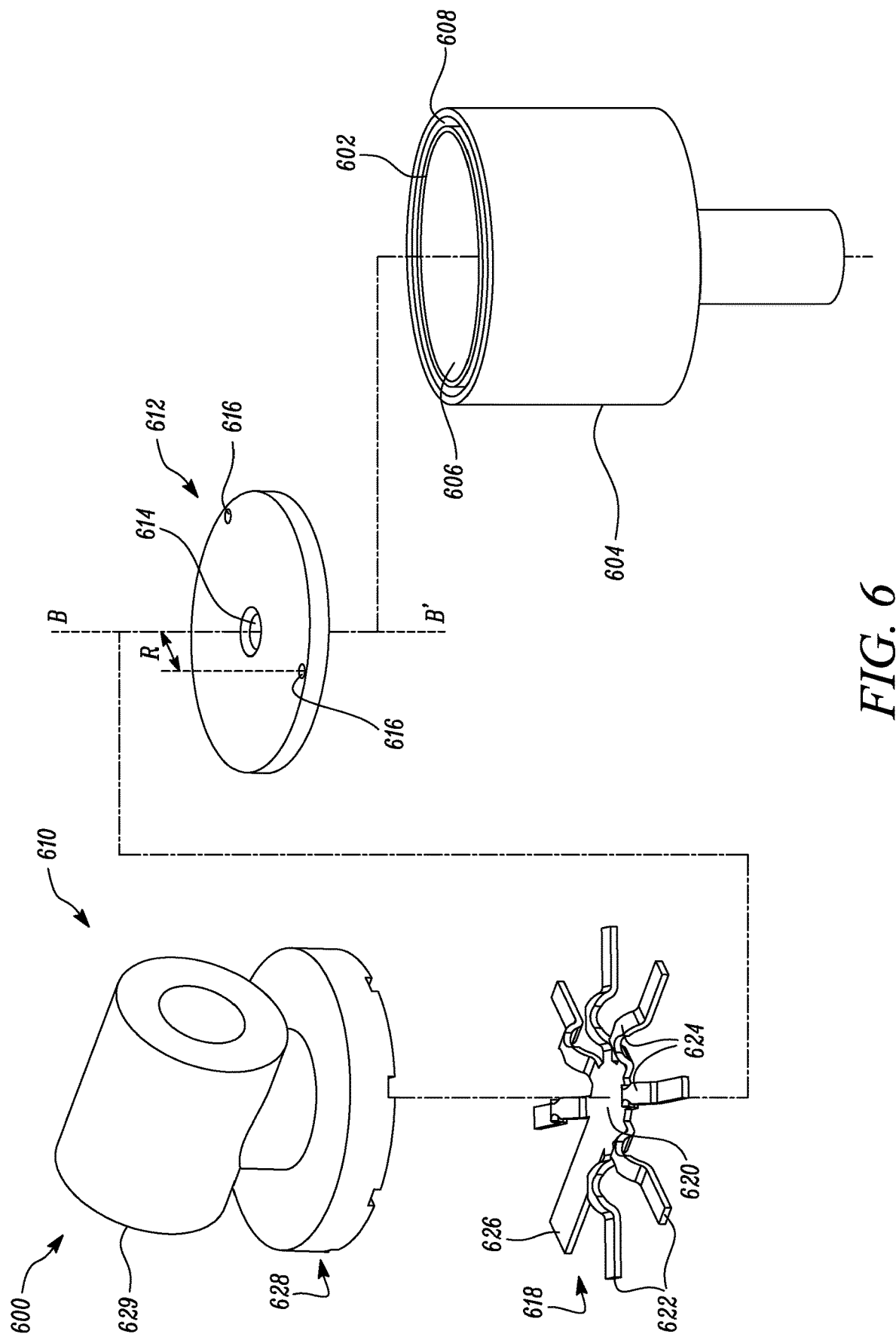
FIG. 6 shows an exploded perspective view of a shock absorber having a valve assembly, in accordance with another embodiment of the present invention.

Another embodiment of the present disclosure is illustrated through FIGS. 6 to 9. FIG. 6 shows an exploded perspective view of a damper 600 according to another embodiment of the present disclosure. The damper 600 includes an inner tube 602 and an outer tube 604. The inner tube 602 defines an inner chamber 606 such that a piston (not shown) may slide inside the inner tube 602. A working fluid may be selectively compressed through sliding motion of the piston within the inner chamber 606 resulting in a dampening effect. An outer chamber 608 is defined between the inner tube 602 and the outer tube 604. The outer chamber 608 may also store the working fluid as a reservoir, and may selectively supply or receive the working fluid from the inner chamber 606. A valve assembly 610 fluidly couples the inner chamber 606 and the outer chamber 608.

The valve assembly 610 includes a first valve plate 612. The first valve plate 612 is attached to the outer tube 604 of the damper 600. The outer tube 604 of the damper 600 may be crimped or rolled on the first valve plate 612 in order to provide sealing and physical strength. The outer tube 604 may be coupled to the first valve plate 612 by any other suitable method as well. The inner tube 602 may also be attached to the first valve plate 612 in a similar manner. The first valve plate 612 may include a peripheral portion which is attached to the outer tube 604 and covers the outer chamber 608. Further, the first valve plate 612 may at least partially extend inside the inner chamber 606 as well. The structure of the first valve plate 612 may be defined in any other suitable manner as well, and the present disclosure is not limited by any such changes in the structure of the first valve plate 612.

As illustrated, a central axis B-B' passes through a center of the first valve plate 612. The first valve plate 612 defines a first opening 614 and at least one second opening 616. The first opening 614 is defined as a central opening in the first valve plate 612. The first opening 614 allows the working fluid to flow out of the inner chamber 606. Although, the first opening 614 is illustrated as a circular opening, it should be contemplated that the first opening 614 may have any other suitable shape as well. The at least one second opening 616 is defined at a radial distance R from the central axis B-B'. In the illustrated embodiment, the at least one second opening 616 includes two second openings 616. However, it should be contemplated that the first valve plate 612 may include any number of second openings 616 as per application requirements.

The valve assembly 610 includes a valve element 618 located above the first valve plate 612. The valve element 618 includes a central portion 620 located above the first opening 614. The central portion 620 covers the first opening 614. The central portion 620 may be substantially circular. The valve element 618 includes at least one tab 622 extending outwards from the central portion 620. The at least one tab 622 may include any number of tabs 622. In the illustrated embodiment, the at least one tab 622 includes seven such tabs 622. Each of the tabs 622 includes a biasing portion 624. The biasing portion 624 biases the central portion 620 of the valve element 618 towards the first opening 614 such that the central portion 620 covers the first opening 614. The valve element 618 further includes a common tab 626 extending outwards from the central portion 620. The common tab 626 has a uniform width along a length of the common tab 626.

Figure 7:
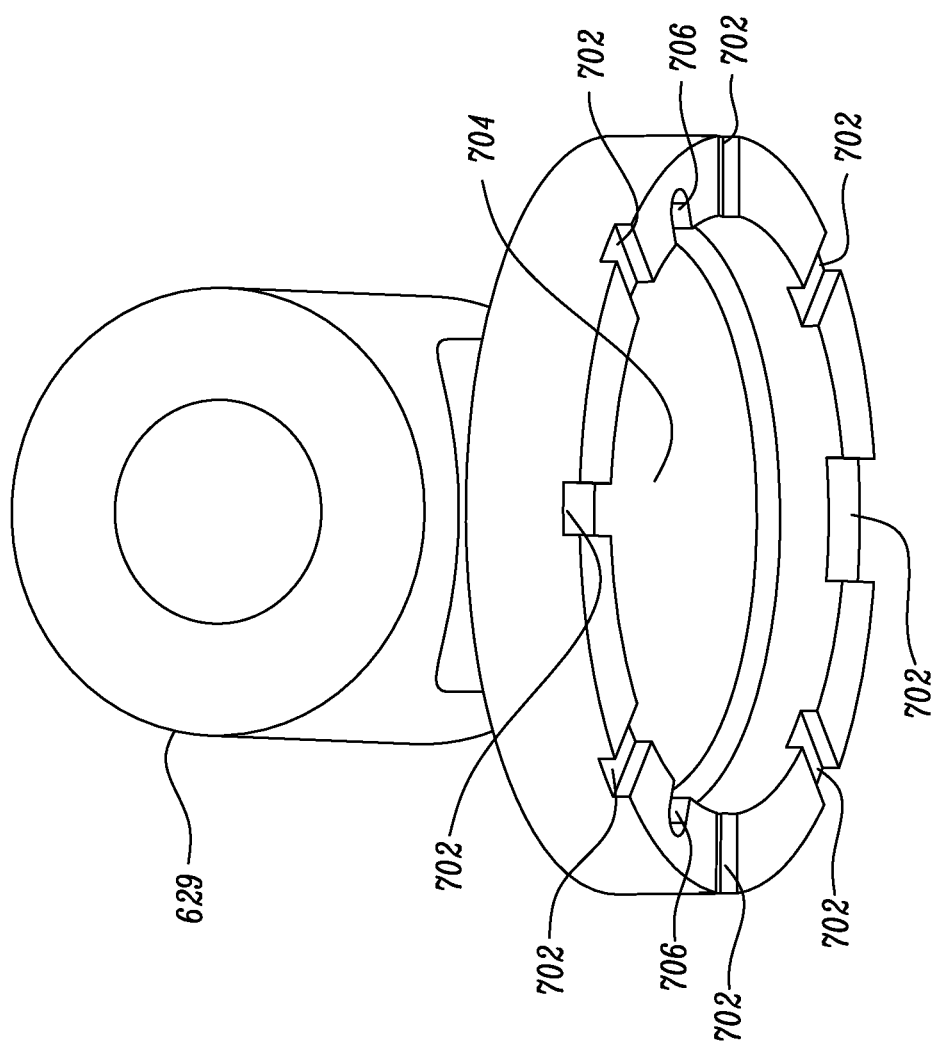
FIG. 7 shows a bottom perspective view of the second valve plate, in accordance with another embodiment of the present invention.

The valve assembly 610 further includes a second valve plate 628. The second valve plate 628 further includes a bearing portion 629 that extends from the main body. The bearing portion 629 is adapted to be coupled to a bearing (not shown). FIG. 7 shows further structural details of the second valve plate 628 through a bottom view. The second valve plate 628 is located above the valve element 618. The second valve plate 628 may be coupled to the first valve plate 612 by any suitable joining means, such as ultrasonic welding, hot stamping, mechanical fasteners etc. As shown in FIG. 7, the second valve plate 628 defines at least one cutout 702. The at least one cutout 702 at least partially encloses the at least one tab 622 of the valve element 618 and allows the at least one tab 622 to extend out of the second valve plate 628. The at least one tab 622 radially extends beyond a circumferential edge of one of the first valve plate 612 and the second valve plate 628. In the illustrated embodiment, the valve element 618 includes seven tabs 622, and the common tab 626. Correspondingly, the second valve plate 628 includes eight cutouts 702 to allow the seven tabs 622 and the common tab 626 to extend out of the second valve plate 628.

The second valve plate 628 defines a fluid chamber 704 such that the working fluid flowing from the inner chamber 606 through the first opening 614 flows to the fluid chamber 704. The fluid chamber 704 fluidly couples the first opening 614 to the at least one second opening 616. The second valve plate 628 further includes at least one groove 706. The groove 706 is in fluid communication with the at least one second opening 616. The groove 706 is also fluidly coupled with the fluid chamber 704. In the illustrated embodiment, the second valve plate 628 includes a pair of such grooves 706 for the two second openings 616.

Figure 8B:
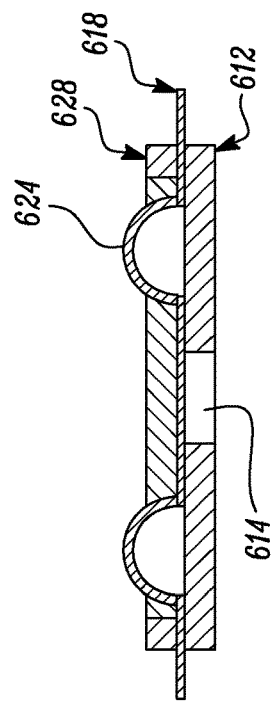
FIGS. 8A and 8B show different schematic views of the valve assembly, in accordance with the present invention.
Figure 8A:
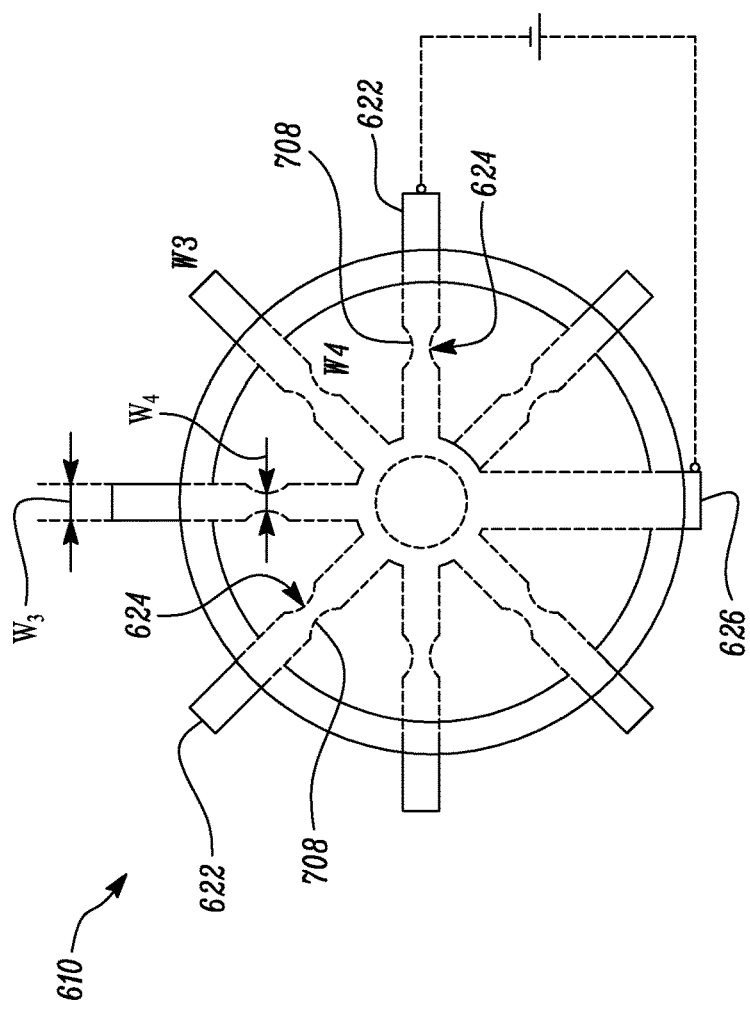

FIGS. 8A and 8B are schematic views of the valve assembly 610. Referring to FIG. 8A, each of the tabs 622 includes the biasing portion 624. The biasing portion 624 may have spring characteristics induced while manufacturing. Spring characteristics may be induced based on usage of a different material, or selective heat treatment of a portion of the tab 622, or any other such suitable means. The biasing portion 624 includes a narrow section 708. The narrow section 708 has a minimum width $W_3$ lesser than a width $W_4$ of rest of the tab 622. The narrow section 708 has curved edges which define a crescent type shape of the tab 622 at the narrow section 708.

With combined reference to FIGS. 8A and 8B, during assembly of the damper 600, the first valve plate 612 is placed over the inner tube 602 and the outer tube 604. The valve element 618 is placed above the first valve plate 612 such that the central portion 620 of the valve element 618 covers the first opening 614. Then, the second valve plate 628 is placed over the valve element 618 such that the tabs 622 are at least partially enclosed by the cutouts 702 of the second valve plate 628. The tabs 622 extend beyond a circumferential edge of each of the first valve plate 612 and the second valve plate 628. Electrical energy is passed through the common tab 626, and at least one another tab 622. Passage of electrical energy through the at least one another tab 622 may raise temperature of the narrow section 708 of the biasing portion 624. In an embodiment, material removal may occur at the narrow section 708 through melting, or vaporization of the material of the tab 622.

Due to passage of electrical energy, spring characteristics of the biasing portion 624 of the at least one tab 622 may be altered without melting the narrow section 708. The spring characteristic of the biasing portion 624 typically may depend on various factors, such as, but not limited to, bulk modulus, heat treatment processes while manufacturing, temperature, density of material etc. Passage of electrical energy may alter one or more of such factors, and the spring characteristic of the biasing portion 624 may get changed accordingly. To achieve a certain damping characteristic from the damper 600, electrical energy may be selectively supplied to a number of tabs 622. The spring characteristic may also depend upon amount of electrical energy provided. Therefore, the tabs 622 may be provided with suitable amount of electrical energy to provide a required spring characteristic of the biasing portion 624.

Figure 9:
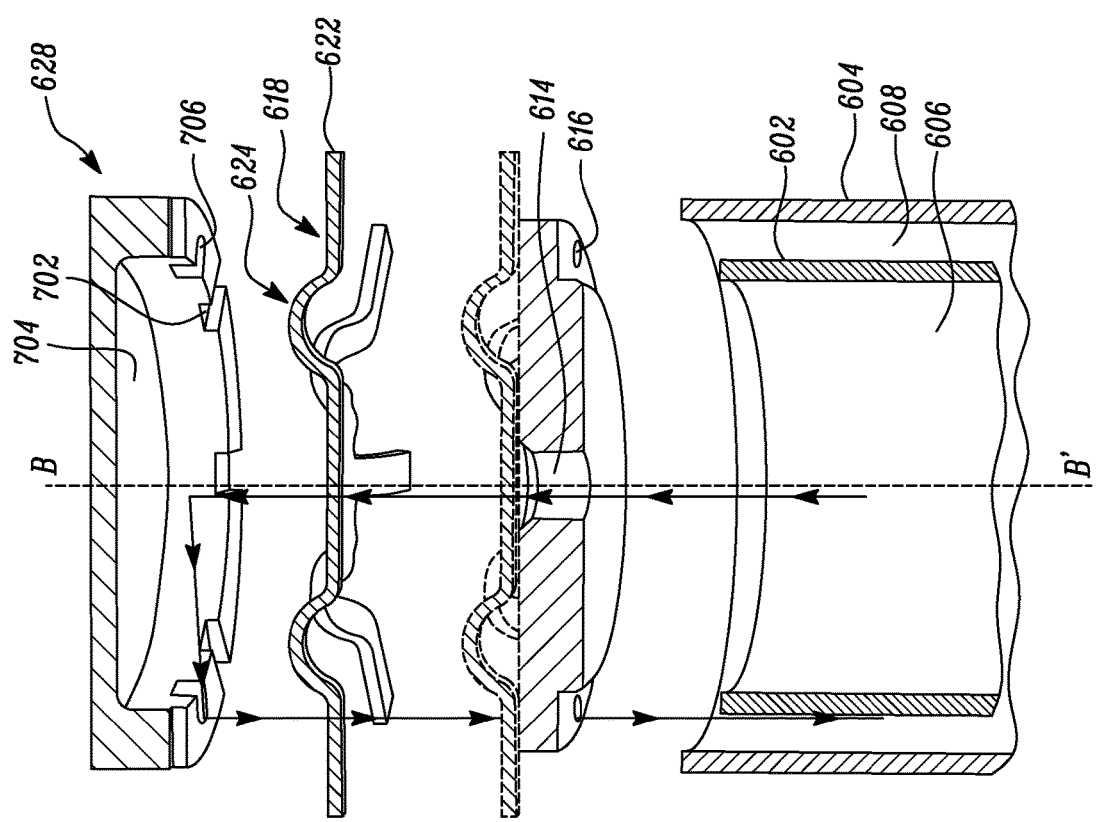
FIG. 9 shows a cross-sectional view of the shock absorber showing a flow pattern of a working fluid, in accordance with another embodiment of the present invention.

Referring to FIG. 9, a cross-sectional view of the damper 600 is illustrated. The valve element 618 moves between an engaged position (shown by dashed lines) and a disengaged position (shown by solid lines) based on pressure inside the inner chamber 606. When the pressure inside the inner chamber 606 is lower than a threshold pressure, the valve element 618 stays in the engaged position. In the engaged position, the central portion 620 of the valve element 618 covers the first opening 614 in the first valve plate 612 and does not allow passage of the working fluid through the first opening 614.

When the pressure inside the inner chamber 606 exceeds the threshold pressure, the pressure of working fluid pushes the valve element 618 to the disengaged position. The valve element 618 shifts away from the first valve plate 612 and the first opening 614 is uncovered. The working fluid may now pass through the first opening 614. The working fluid passes through the first opening 614 and enters the fluid chamber 704. The fluid chamber 704 is also fluidly coupled to the at least one second opening 616 in the first valve plate 612. The working fluid may flow through the fluid chamber 704, and flow to the outer chamber 608 through the at least one second opening 616. The second valve plate defines the 706 groove which fluidly couples the first opening 614 with the at least one second opening 616 in the disengaged state of the valve element 618. The working fluid flows from the fluid chamber 704 to the outer chamber 608 through the groove 706 and the at least one second opening 616.

The threshold pressure at which the valve element 618 may move to the disengaged position from the engaged position may be adjusted based on passage of electrical energy through the biasing portion 624 of the tabs 622. The spring characteristics of the biasing portion 624 of one or more tabs 622 may be altered to attain a desired value of the threshold pressure. The threshold pressure may be defined based on application requirements, and then spring characteristics of the biasing portion 624 of one or more tabs 622 may be manipulated accordingly to attain the required threshold pressure value.

Thus, the valve assembly 610 described by the present disclosure provides a user with a certain degree of programmability to suit the need of the application area for which the damper 600 is being used. The structural aspects of the valve element 618, the first valve plate 612 and the second valve plate 628 described in the context of the present disclosure are merely exemplary. It should be contemplated that there may be various other structural arrangements to provide different means of fluid flow patterns from the inner chamber 606 to the outer chamber 608, and the present disclosure is not limited by any such structural configurations. The structure of the valve element 618, and steps of passage of electrical energy ensure that the valve assembly 610 may be suitably modified as per application requirements.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A valve assembly comprising:
   a first valve plate defining at least one first opening and at least one second opening;
   a valve element disposed above the first valve plate, the valve element including:
   a central portion; and
   at least one tab extending outwards from the central portion, the at least one tab including a narrow portion axially aligned with the at least one first opening such that the narrow portion at least partially covers the at least one first opening, wherein the at least one tab is selectively provided with electrical energy to melt the narrow portion to form an orifice, and wherein the orifice is fluidly coupled with the at least one first opening; and
   a second valve plate disposed above the valve element, the second valve plate adapted to fluidly communicate the orifice with the at least one second opening of the first valve plate.

2. The valve assembly of claim 1, wherein the second valve plate further includes:
   a groove aligned with the narrow portion of the at least one tab, the groove being fluidly coupled to the orifice; and
   at least one channel axially aligned with the at least one first opening such that the at least one channel fluidly couples the groove with the at least one second opening.

3. The valve assembly of claim 1, wherein the at least one tab extends beyond a circumferential edge of one of the first valve plate and the second valve plate.

4. The valve assembly of claim 1, wherein the valve element further includes a common tab extending from the central portion, the common tab having a uniform width along a length of the common tab.

5. The valve assembly of claim 1, wherein:
   the at least one first opening is disposed at a first radial distance relative to a central axis of the first valve plate; and
   the at least one second opening is disposed at a second radial distance relative to the central axis, wherein the second radial distance is greater than the first radial distance.

6. The valve assembly of claim 1, wherein the first valve plate is connected to an outer tube of a damper, wherein the at least one first opening is fluidly coupled to an inner chamber defined by an inner tube of the damper, and wherein the at least one second opening is fluidly coupled with an outer chamber defined between the inner tube and the outer tube.

7. A valve assembly for a damper having an inner tube and an outer tube, the valve assembly comprising:
   a first valve plate attached to the outer tube of the damper, the first valve plate defining at least one first opening and at least one second opening, wherein the at least one first opening is disposed in fluid communication with an inner chamber defined by the inner tube of the damper, and wherein the at least one second opening is disposed in fluid communication with an outer chamber defined between the inner tube and the outer tube of the damper;
   a valve element disposed above the first valve plate, the valve element including:
   a central portion; and
   at least one tab extending outwards from the central portion, the at least one tab including a narrow portion axially aligned with the at least one first opening such that the narrow portion at least partially covers the at least one first opening, wherein the at least one tab is selectively provided with electrical energy to melt the narrow portion to form an orifice, and wherein the orifice is fluidly coupled with the at least one first opening; and
   a second valve plate disposed above the valve element, the second valve plate adapted to fluidly communicate the orifice with the at least one second opening of the first valve plate.

8. The valve assembly of claim 7, wherein the second valve plate further includes:
   a groove aligned with the narrow portion of the at least one tab, the groove being fluidly coupled to the orifice; and
   at least one channel axially aligned with the at least one first opening such that the at least one channel fluidly couples the groove with the at least one second opening.

9. The valve assembly of claim 7, wherein the at least one tab radially extends beyond a circumferential edge of one of the first valve plate and the second valve plate.

10. The valve assembly of claim 7, wherein the valve element further includes a common tab extending from the central portion, the common tab having a uniform width along a length of the common tab.

11. The valve assembly of claim 7, wherein:
    the at least one first opening is disposed at a first radial distance relative to a central axis of the first valve plate; and
    the at least one second opening is disposed at a second radial distance relative to the central axis, wherein the second radial distance is greater than the first radial distance.

12. The valve assembly of claim 7, wherein the second valve plate further includes at least one groove adapted to at least partially enclose the at least one tab of the valve element.

13. A valve assembly comprising:
    a first valve plate defining a first opening and at least one second opening;
    a valve element disposed above the first valve plate, the valve element comprises:

a central portion disposed above the first opening; and at least one tab extending outwards from the central portion, the at least one tab including a biasing portion adapted to bias the central portion towards the first opening of the valve element, wherein the at least one tab is selectively provided with electrical energy to change a spring characteristic of the at least one tab; and a second valve plate disposed above the valve element, wherein the valve element is at least partially enclosed between the first valve plate and the second valve plate, wherein the valve element is adapted to move between:

an engaged position in which the central portion of the valve element covers the first opening, and a disengaged position in which the first opening is fluidly coupled with the at least one second opening;

wherein the biasing portion of the at least one tab includes a narrow section; and wherein the at least one tab is selectively provided with electrical energy to melt the narrow section of the at least one tab.

14. The valve assembly of claim 13, wherein the second valve plate further includes at least one cutout, the at least one cutout adapted to allow the at least one tab to extend out of the second valve plate.

15. The valve assembly of claim 13, wherein the second valve plate further defines a fluid chamber.

16. The valve assembly of claim 13, wherein the second valve plate further includes at least one groove disposed in fluid communication with the at least one second opening.

17. The valve assembly of claim 13, wherein the at least one tab radially extends beyond a circumferential edge of one of the first valve plate and the second valve plate.

18. The valve assembly of claim 13, wherein the valve element further includes a common tab extending from the central portion, the common tab having a uniform width along a length of the common tab.

* * * * *